Patented Aug. 5, 1941

2,251,688

UNITED STATES PATENT OFFICE 2,251,688

PROCESS FOR THE SULPHONATION OF ALPHA-AMINOANTHRAQUINONE COMPOUNDS

James Ogilvie and Robert C. Hoare, Buffalo, N. Y., assignors to National Aniline & Chemical Company, Inc., New York, N. Y., a corporation of New York No Drawing. Application February 1, 1938, Serial No. 188,191

15 Claims. (Cl. 260—371)

The present invention relates to a process for the preparation of sulphonates of alpha-aminoanthraquinones and more particularly to a process for the preparation of 1-aminoanthraquinone-2-sulphonic acid in the form of the free acid or its salts; e. g., the sodium salt.

Aminoanthraquinone sulphonates which contain the amino group in the 1-position and the sulphonic acid or sulphonate group in the 2-position are valuable intermediates for the production of anthraquinone dyestuffs of various types, and particularly acid wool dyestuffs. The preparation of 1-aminoanthraquinone-2-sulphonic acid, the most important member of this class, has occupied the attention of many investigators, but so far as is known, no process entirely satisfactory from a commercial standpoint has yet been developed for the preparation of this compound. The attempts to develop satisfactory processes have involved the preparation of 1-aminoanthraquinone-2-sulphonic acid by indirect processes, and processes in which 1-aminoanthraquinone is sulphonated directly. The indirect processes have included such procedures as the oxidation of a mercaptan group, the replacement of halogen atoms or other substituents with sulphonic acid or amino groups, the reduction of a nitro group, and the like. Such processes are unsatisfactory from a commercial standpoint since they require a relatively complicated series of steps or make use of difficultly obtainable raw materials.

It has been recognized that direct sulphonation of 1-aminoanthraquinone by ordinary sulphonation methods is impractical, due to the formation of undesirable by-products, such as oxidation products and isomers, thus reducing the yield of 1-aminoanthraquinone-2-sulphonic acid obtainable. In view of this fact, it has been proposed to convert 1-aminoanthraquinone to 1-aminoanthraquinone-2-sulphonic acid by varied modifications of direct sulphonation methods. For example, it has been proposed to sulphonate 1-aminoanthraquinone with a mixture of oleum and an alkali-metal or alkaline earth metal sulphate; to convert the acid sulphate of 1-aminoanthraquinone formed by heating 1-aminoanthraquinone with about an equimolecular amount of sulphuric acid to 1-aminoanthraquinone-2-sulphonic acid by heating to a high temperature; and to form 1-aminoanthraquinone-2-sulphonic acid by heating 1-aminoanthraquinone with an acid alkali-metal sulphate at a high temperature. The yields obtainable by these processes are not as high as could be desired and the 1-aminoanthraquinone-2-sulphonic acid is often obtained in admixture with undesirable by-products.

It is an object of the present invention to provide a process for the preparation of 1-aminoanthraquinone-2-sulphonic acid compounds in the free acid or salt form by sulphonation of an alpha-aminoanthraquinone compound which is unsubstituted in the corresponding 2-position, which process is characterized by simplicity and economy in operation and the high yields obtainable.

A further object of the invention is to provide a process for the preparation of 1-aminoanthraquinone-2-sulphonic acid involving the sulphonation of 1-aminoanthraquinone, which process is characterized by the avoidance of undesirable by-products, economy of operation and the high yields of 1-aminoanthraquinone-2-sulphonic acid obtainable.

Other objects of the invention will in part be obvious and will in part appear hereinafter.

It has been found that alpha-aminoanthraquinone compounds containing a sulphonic acid group in the corresponding ortho-position can be prepared by reacting a 1-aminoanthraquinone compound unsubstituted in the 2-, 3-, and 4-positions with chlorsulphonic acid in the manner hereinafter described. The reaction is carried out by intimately contacting the alpha-aminoanthraquinone compound with a substantially equimolecular quantity of chlorsulphonic acid at a low temperature adapted to form an intermediate compound, which as brought out more fully below appears to be a combination of the alpha-aminoanthraquinone compound with the chlorsulphonic acid or an addition product thereof, and then heating the intermediate compound to a temperature adapted to convert it to the 1-aminoanthraquinone-2-sulphonic acid compound. It has been found that this process is particularly well adapted for the production of 1-aminoanthraquinone-2-sulphonic acid from 1-aminoanthraquinone.

The present invention provides a means for the commercial production of 1-aminoanthraquinone-2-sulphonic acid compounds, and particularly 1-aminoanthraquinone-2-sulphonic acid itself, which is free from the disadvantages of the previously proposed processes. Thus the yields of the desired sulphonic acid compound are unusually high; for example, in the case of 1-aminoanthraquinone-2-sulphonic acid, yields can be obtained varying from 94 per cent to as high as 99 per cent of the theoretically expected yield, based on the weight of the 1-aminoanthraquinone consumed. Further, the process makes use of relatively inexpensive and readily available raw materials. The product obtained as a result of the process is substantially uncontaminated with isomers, by-products caused by oxidation or other actions, or water-soluble foreign materials, such as alkali-metal sulphates; the desired sulphonic acid compound being substantially the only soluble product present in the residue at the completion of the reaction. Although many sulphonation procedures require a large excess of the sulphonating agent, in the present process a large excess is not only not necessary, but is undesirable. While a proportion of unreacted aminoanthraquinone remains at the end of the reaction, this material can be recovered without substantial losses and in a form relatively free from by-products.

In accordance with preferred practice, the process of the invention is carried out by intimately contacting the alpha-aminoanthraquinone compound is prepared in finely divided solid form with the chlorsulphonic acid. In proceeding in this way, the alpha-aminothraquinone compound is prepared in finely divided solid form as by grinding it in a suitable device. A ball mill has been found to be particularly adapted for this purpose. Since the sulphonation reaction is advantageously carried out in such a mill, in accordance with preferred procedure, the alpha-aminoanthraquinone compound is ground to a fine state of subdivision in the mill, and an amount of chlorsulphonic acid substantially corresponding to one molecular equivalent for one molecular equivalent of the aminoanthraquinone is then introduced slowly in such a manner that the reaction mixture can be maintained with the aid of cooling at a low temperature, for example below 25° C., and preferably below 10° C. The amount of chlorsulphonic acid used should not greatly exceed that theoretically required to form the sulphonic acid compound. After the addition of the chlorsulphonic acid is completed, the reaction mixture is agitated in the ball mill for a period of time sufficient to assure a uniform distribution of the chlorsulphonic acid and to form the intermediate compound. The reaction mixture is then heated to a temperature adapted to convert the intermediate compound to the sulphonic acid compound. This temperature is preferably from 130° to 150° C. During the heating of the intermediate compound, hydrogen chloride is evolved and the completion of the reaction is evidenced by the cessation of the evolution of this gas. The sulphonation mass is then treated in any suitable manner for the recovery of the 1-aminoanthraquinone-2-sulphonic acid compound. For example, the residue may be mixed with water and neutralized with a suitable alkaline material, such as caustic soda. The neutralized solution, preferably after being heated to boiling, is filtered whereby there is obtained a filtrate consisting of an aqueous solution of a salt of a 1-aminoanthraquinone-2-sulphonic acid compound and a precipitate comprising essentially the unreacted alpha-aminoanthraquinone compound which may be dried and used for a following reaction. The salt of the 1-aminoanthraquinone-2-sulphonic acid compound is preferably recovered from the filtrate by salting-out followed by filtration.

While the invention is not limited to any theoretical explanation, it appears that the procedure of intimately contacting the alpha-aminoanthraquinone compound with chlorsulphonic acid results in the formation of a compound (referred to above as an intermediate compound) between the aminoanthraquinone compound and the chlorsulphonic acid. It is believed this compound is a simple addition product, i. e., a salt, of the two components, but this has not been clearly established. In any event, this intermediate compound is not a stable anthraquinone sulphonic acid compound and in the first stage of the process it is advisable to operate so that sulphonation of the aminoanthraquinone compound is substantially avoided. Thus it is important that the temperature be maintained below that at which any reaction other than the formation of the intermediate compound takes place. As above stated, this is preferably below 10° C. For obvious reasons, this temperature should not be excessively low, however. It has been found that temperatures above 5° C. are suitable.

As above indicated, the amount of chlorsulphonic acid employed is an important feature of the process. In the development of the invention, it was found that the process proceeds efficiently using no more than a slight excess of chlorsulphonic acid, but when a large excess of this compound is employed, the process becomes unsatisfactory due to the excessive formation of undesirable by-products. On the other hand, the amount of chlorsulphonic acid should not be reduced below that corresponding to one molecular equivalent for each molecular equivalent of the aminoanthraquinone compound since otherwise a relatively large amount of unreacted aminoanthraquinone remains at the end of the reaction. Accordingly, it will be understood that in stating that the chlorsulphonic acid is employed in the proportions substantially corresponding to about one molecular equivalent for each molecular equivalent of the aminoanthraquinone compound, it is intended to include a quantity of chlorsulphonic acid varying from about one molecular equivalent for each molecular equivalent of the aminoanthraquinone to a slight excess over this amount. In order to insure maximum reaction, it is preferred to employ a slight excess of the chlorsulphonic acid. In general, it has been found that this excess preferably should not be greater than 10 per cent in excess of that theoretically required; i. e., 1.1 molecular equivalents of chlorsulphonic acid for each molecular equivalent of the aminoanthraquinone subjected to treatment. For best results, the amount of chlorsulphonic acid used should be between 5 per cent and 10 per cent greater than the amount theoretically required.

The following example offers an illustration of a preferred manner of practicing the invention; the parts are by weight and the temperature in degrees centigrade.

*Example.*—223 parts of 1-aminoanthraquione are charged to a ball mill. The mill is rotated for 3 hours in order to reduce the 1-aminoanthraquinone to a fine state of subdivision. 127 parts of chlorsulphonic acid; i. e., about 10 per cent in excess of the molar equivalent of the 1-aminoanthraquinone, are added to the ball mill at a uniform rate during a period of about ½ to about 1 hour, while cooling the mill with circulating water which has a temperature of approximately 10°. After the addition of the chlorsulphonic acid is complete, the mill is rotated for 3 hours, with constant cooling, in order to insure a uniform distribution of the sulphonating agent, and thus promote the formation of an intermediate compound of 1-aminoanthraquinone with chlorsulphonic acid. The contents of the mill are then heated to a temperature between 130° and 140°. This temperature is maintained until no further hydrogen chloride is evolved, which requires about 15 to about 16 hours. The mill is then allowed to cool, and the grayish-white powder which remains as a residue is introduced into about 2500 parts of water. The resulting suspension is neutralized with aqueous sodium hydroxide, using brom-cresol green as an indicator. The neutralized suspension is heated to boiling and filtered. The cake consists chiefly of unreacted 1-aminoanthraquinone. It is dried and used for a following sulphonation. A quantity of sodium chloride sufficient to raise the gravity of the filtrate to about 20° Bé., the amount usually required being about 15 per cent of the weight of the filtrate, is added to the latter at a temperature of about 90° in order to salt out the 1-aminoanthraquinone-2-sodium sulphonate. The solution is cooled to about 40° and filtered. 1-aminoanthraquinone-2-sodium sulphonate is recovered as the cake, and subsequently dried. Approximately 265 parts of the sodium salt are thus obtained. About 30 to about 35 parts of unreacted 1-aminoanthraquinone are recovered. The yield of 1-aminoanthraquinone-2-sodium sulphonate is 94 per cent to 97 percent of the expected theoretical yield, based on the amount of 1-aminoanthraquinone consumed.

In carrying out the process of the invention in accordance with the procedure of this example, it is important that the 1-aninoanthraquinone compound be in finely divided solid form before contacting it with the chlorsulphonic acid. To this end, it is preferable to comminute the 1-aminoanthraquinone compound in a ball mill or similar device for the period of time necessary to reduce it to the desired particle size. After the introduction of the chlorsulphonic acid, the comminution is continued so as to intimately contact all portions of the 1-aminoanthraquinone compound with the chlorsulphonic acid.

When reacting an alpha-aminoanthraquinone in finely divided solid form with chlorsulphonic acid, as in the example, it is important to avoid local overheating during the conversion of the intermediate compound to the sulphonic acid compound. For this reason, the contents of the reaction vessel should be subjected to continuous agitation during this step. Carried out in this manner, the procedure of this example results in the formation of the desired 1-aminoanthraquinone-2-sulphonic acid compound in excellent yields.

In place of the 1-aminoanthraquinone of the example there may be employed other alpha-aminoanthraquinone compounds in which the 2-, 3-, and 4-positions are unsubstituted while one or more of the positions 5, 6, 7, and 8 may be substituted by amino, halogen, or sulphonic acid groups. Examples of such substituted anthraquinone compounds are: 1-amino-5 (6, 7, or 8)-chloranthraquinone; 1-aminoanthraquinone-5-sodium sulphonate; 1, 5- or 1, 8-diaminoanthraquinone, etc. Thus by the process of the present invention 1, 5-diaminoanthraquinone can be sulphonated in one stage to form 1, 5-diamino-2-sulphoanthraquinone and then the latter compound may be treated to form 1, 5-diamino-2, 6-disulphoanthraquinone.

As has been stated, in heating the intermediate compound to convert it to the sulphonic acid compound, the heating is continued until the conversion is completed as evidenced by the cessation of evolution of hydrogen chloride. The time required to accomplish this purpose varies with the extent of agitation, the specific temperature maintained, and other factors, but it has been found that ordinarily from about 10 to about 16 hours is suitable. While the conversion proceeds satisfactorily at temperatures between 130° and 150° C., for most efficient operation temperatures between 130° and 145° are employed.

The residue remaining after the sulphonation may be worked up in any desired manner for the recovery of the 1-aminoanthraquinone-2-sulphonic acid compound. When this compound is recovered by mixing the residue with water, the water is preferably used in the proportions of about 10 to about 16 parts by weight for each part by weight of the aminoanthraquinone compound originally sulphonated. The resulting mixture is neutralized with a suitable alkaline material, such as caustic soda, and is then heated to boiling and filtered. Unsulphonated aminoanthraquinone compound is separated as the cake which may be dried and added to a following sulphonation batch. The sodium salt of the 1-aminoanthraquinone-2-sulphonic acid compound may be salted out of the filtrate by adding sufficient sodium chloride to raise the gravity of the filtrate to about 20° Bé., the amount usually required being from about 15 to about 20 per cent of the weight of the filtrate. The precipitated sodium salt of the 1-aminoanthraquinone-2-sulphonic acid is recovered by filtration and dried.

It will be understood that changes may be made in the process described above without departing from the invention. It is intended, therefore, that the description shall be interpreted as illustrative and not in a limiting sense.

We claim:

1. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises reacting said aminoanthraquinone compound with chlorsulphonic acid under non-sulphonating conditions to form an intermediate compound between said aminoanthraquinone compound and the chlorsulphonic acid, and heating the intermediate compound to convert the intermediate compound to a 1-aminoanthraquinone-2-sulphonic acid compound.

2. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises intimately contacting said aminoanthraquinone compound with a substantially equimolecular proportion of chlorsulphonic acid at a temperature adapted to form an intermediate compound between said aminoanthraquinone compound and the chlorsulphonic acid, and heating the intermediate compound to convert the intermediate compound to a 1-aminoanthraquinone-2-sulphonic acid compound.

3. In the process for the preparation of 1-aminoanthraquinone-2-sulphonic acid by sulphonating 1-aminoanthraquinone, the improvement which comprises reacting 1-aminoanthraquinone with chlorsulphonic acid under non-sulphonating conditions to form an intermediate compound between the 1-aminoanthraquinone and the chlorsulphonic acid, and heating the intermediate compound to convert the intermediate compound to 1-aminoanthraquinone-2-sulphonic acid.

4. The process for the preparation of 1-aminoanthraquinone-2-sulphonic acid, which comprises intimately contacting 1-aminoanthraquinone with chlorsulphonic acid in substantially equimolecular proportions at a temperature below 25° C. to form an intermediate compound between the 1-aminoanthraquinone and the chlorsulphonic acid, and heating the intermediate compound at a temperature between 130° and 150° C. to convert the intermediate compound to 1-aminoanthraquinone-2-sulphonic acid.

5. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises heating an intermediate compound between said aminoanthraquinone compound and chlorsulphonic acid to convert the intermediate compound to a 1-aminoanthraquinone-2-sulphonic acid compound, said intermediate compound being obtainable by reacting said aminoanthraquinone compound with chlorsulphonic acid in substantially equimolecular proportions under non-sulphonating conditions.

6. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises heating an intermediate compound between said aminoanthraquinone compound and chlorsulphonic acid to convert the intermediate compound to a 1-aminoanthraquinone-2-sulphonic acid compound, said intermediate compound being obtainable by intimately contacting the aminoanthraquinone compound with chlorsulphonic acid in substantially equimolecular proportions at a temperature between 5° and 25° C.

7. In the process for the preparation of 1-aminoanthraquinone-2-sulphonic acid, the step which comprises heating an intermediate compound between 1-aminoanthraquinone and chlorosulphonic acid at a temperature between 130° and 150° C. to convert the intermediate compound to 1-aminoanthraquinone-2-sulphonic acid, said intermediate compound being obtainable by intimately contacting 1-aminoanthraquinone with chlorsulphonic acid under non-sulphonating conditions.

8. The process for the preparation of a 1-aminoanthraquinone-2-sulphonic acid compound, which comprises intimately contacting an aminoanthraquinone compound, in which an amino group is in the 1-position, the remaining positions of the benzene nucleus containing said amino group are unsubstituted, and the positions of the other benzene nucleus are occupied by members selected from the group consisting of hydrogen, amino, halogen, and sulphonic acid, with chlorsulphonic acid in substantially equimolecular proportions at a temperature between 5° and 25° C. to form an intermediate compound between the aminoanthraquinone compound and the chlorsulphonic acid, and heating the intermediate compound at a temperature between 130° and 150° C. to convert the intermediate compound to a 1-aminoanthraquinone-2-sulphonic acid compound.

9. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises reacting said aminoanthraquinone compound in the solid phase with chlorsulphonic acid under non-sulphonating conditions to form an intermediate compound between said aminoanthraquinone compound and the chlorsulphonic acid by intimately contacting said aminoanthraquinone compound in finely-divided solid form with chlorsulphonic acid under non-sulphonating conditions, and heating the intermediate compound to convert the intermediate compound to a 1-aminoanthraquinone-2-sulphonic acid compound.

10. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises reacting said aminoanthraquinone compound in the solid phase with chlorsulphonic acid to form an intermediate compound between said aminoanthraquinone compound and the chlorsulphonic acid by intimately contacting said aminoanthraquinone compound in finely divided solid form with chlorsulphonic acid in substantially equimolecular proportions at a temperature below 25° C., and heating the intermediate compound at a temperature between 130° and 150° C. to convert the intermediate compound to a 1-aminoanthraquinone-2-sulphonic acid compound.

11. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises reacting said aminoanthraquinone compound in the solid phase with chlorsulphonic acid to form an intermediate compound between said aminoanthraquinone compound and the chlorosulphonic acid by intimately contacting said aminoanthraquinone compound in finely-divided solid form with an amount of chlorsulphonic acid corresponding to from 1 molecular equivalent to 1.1 molecular equivalents for each molecular equivalent of said aminoanthraquinone compound at a temperature below 25° C., heating the intermediate compound at a temperature between 130° and 150° C. to convert the intermediate compound to a 1-aminoanthraquinone-2-sulphonic acid compound, and recovering the 1-aminoanthraquinone-2-sulphonic acid compound.

12. In the process for the preparation of a 1-aminoanthraquinone-2-sulphonic acid compound by sulphonating an aminoanthraquinone compound in which an amino group is in the 1-position and the 2-, 3-, and 4-positions are unsubstituted, the improvement which comprises reacting said aminoanthraquinone compound in the solid phase with chlorsulphonic acid to form an intermediate compound between said aminoanthraquinone compound and the chlorsulphonic acid by comminuting a mixture of said aminoanthraquinone compound in finely-divided solid form and chorsulphonic acid in substantially equimolecular proportions at a temperature below 25° C., heating the intermediate compound at a temperature between 130° and 145° C. while agitating to convert the intermediate compound to a 1-aminoanthraquinone-2-sulphonic acid compound, and recovering the 1-aminoanthraquinone-2-sulphonic acid compound.

13. The process for the preparation of 1-aminoanthraquinone-2-sulphonic acid, which comprises reacting 1-aminoanthraquinone in the solid phase with chlorosulphonic acid by comminuting a mixture of finely divided solid 1-aminoanthraquinone with chlorsulphonic acid in substantially equimolecular proportions at a temperature below 25° C. to form an intermediate compound between the 1-aminoanthraquinone and the chlorsulphonic acid, and heating the intermediate compound at a temperature between 130° and 145° C. while agitating to convert the intermediate compound to 1-aminoanthraquinone-2-sulphonic acid.

14. The process for the preparation of a 1-aminoanthraquinone-2-sulphonic acid compound, which comprises reacting an aminoanthraquinone compound, in which an amino group is in the 1-position, the remaining positions of the benzene nucleus containing said amino group are unsubstituted, and the positions of the other benzene nucleus are occupied by members selected from the group consisting of hydrogen, amino, halogen, and sulphonic acid in the solid phase with chlorsulphonic acid by intimately contacting the aminoanthraquinone compound in finely divided solid form with chlorsulphonic acid in substantially equimolecular proportions at a temperature below 25° C. to form an intermediate compound between the aminoanthraquinone compound and the chlorsulphonic acid, and heating the intermediate compound at a temperature between 130° and 150° C. to convert the intermediate compound to a 1-aminoanthraquinone-2-sulphonic acid compound.

15. The process for the preparation of 1-aminoanthraquinone-2-sulphonic acid, which comprises reacting 1-aminoanthraquinone in the solid phase with chlorsulphonic acid by comminuating a mixture of finely divided solid 1-aminoanthraquinone and an amount of chlorsulphonic acid corresponding to from 1 molecular equivalent to 1.1 molecular equivalents for each molecular equivalent of 1-aminoanthroquinone at a temperature between 5° and 10° C. to form an intermediate compound between the 1-aminoanthraquinone and the chlorsulphonic acid, heating the intermediate compound at a temperature between 130° and 145° C. while agitating to convert the intermediate compound to 1-aminoanthraquinone-2-sulphonic acid, and recovering the 1-aminoanthraquinone-2-sulphonic acid.

JAMES OGILVIE.
ROBERT C. HOARE.